No Printed Specification Available
6441X
H. KNOWLES.
MAKING WOOD SCREWS.
Patented Apr. 1, 1831.
A.
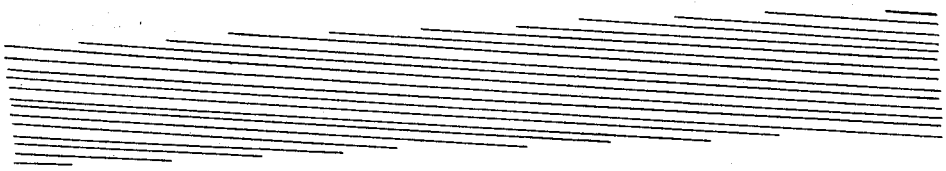
B.
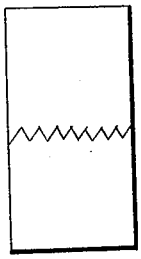
A
Impression taken from the face of the die.
The transverse section
B.
THE NORRIS PETERS CO., PHOTO-LITHO., WASHINGTON, D. C.

6441X

UNITED STATES PATENT OFFICE.

HAZARD KNOWLES, OF COLCHESTER, CONNECTICUT.

IMPROVED MODE OF MANUFACTURING WOOD-SCREWS.

Specification forming part of Letters Patent dated April 1, 1831.

*To all whom it may concern:*

Be it known that I, HAZARD KNOWLES, of Colchester, in the county of New London and State of Connecticut, have invented a new and useful Improvement in the Mode of Manufacturing Wood-Screws, of which the following is a full and exact description.

The improvement that I have invented consists in the method of raising or producing the thread of the screw, which is done not upon the principle of cutting out or removing the metal of the wire or cylinder upon which the thread is to be produced, so as to leave it standing in relief, (by means of a file or any kind of edge-tool whatever,) but upon the principle of forcing the metal aside and driving it up so as to constitute the spiral thread; and this is done by subjecting the wire or metal cylinder upon which the thread is to be produced to pressure while revolving between two oblong plates or dies of tempered steel, which are made to pass over or by each other in parallel lines, and of which each one has its face grooved or creased in such manner as to correspond with and form a counterpart to the other, and so as to regulate and produce the thread upon the wire or metal cylinder as it is compressed between them and made to revolve by their motion. The grooved plates above mentioned may be of any thickness that will allow a crease or groove of sufficient depth to form the desired thread, and each plate may be welded or otherwise firmly attached to a bed or basis of iron or other metal, which must be massive enough to sustain any degree of pressure that may be required in order to raise the thread, and they should be so long as to allow as many revolutions of the wire or cylinder between them as may be necessary to force up the thread to the desired sharpness and smoothness, and they must be of a width that shall at least equal the length of that part of the metal which is to receive the thread, the extent to which the wire is admitted between the plates being determined by experience and adjusted or gaged by means of a set-screw. Both of these plates or dies may move, or one may be kept in motion and the other at rest. They may be attached to or connected with any machine that is capable of producing the motion and of sustaining the requisite pressure, and the motion may be given by a crank or a cam at pleasure, the plates being supported or carried by any kind of bed or carriage traversing upon rails or between ways, or finally one of the plates may be made convex and the other concave, and one of them may be attached to the periphery of a wheel, the other remaining at rest either above or below it, and the pressure being produced by a slight difference between the convexity of one and the concavity of the other or by a little eccentricity of the circles upon which one rests and the other moves. I prefer and use the reciprocating motion produced by a cam either in one or in both of the plates, and these I sometimes drive one over the other in a horizontal motion, the cylinder or wire lying horizontally and revolving between them, and sometimes one by the side of the other, the cylinder standing perpendicularly as it revolves. The constructer may arrange them in such relative position as he may prefer.

Annexed is a drawing of one of the plates or dies, the lines representing the ridges between the grooves or creases. These will always run obliquely, and for right-hand screws they must rise as they run from right to left, the angle at the bottom being greater or less and the lines themselves being more or less near to each other, always being exactly parallel, according to the size of the cylinder and the fineness of the thread, the angle increasing as the thread increases in its gain and its size. The grooves or creases in the face of each die must of course be deep and the ridges between them sharp, according to the desired depth and sharpness of the thread, and one or both of the dies or plates must be so constructed that their faces shall gradually come nearer to each other as the cylinder is carried between them till it has reached about the middle of the plates, and from that point that their faces shall be parallel to each other during the rest of their motion, their motion being always in right lines and the sides of the dies that correspond to each other always moving upon the same line or upon parallel lines. From about the middle of the plate, measuring from end to end, the ridges between the grooves gradually become wider at the top and the grooves more sharp at the bottom, in order to leave the spaces between the threads of the screw broad at the bottom and the threads themselves thin and sharp at the top, if it is desired to give the screw that form or character, and small transverse cuts run across the ridges at right angles with the sides of the die and quite near to each other, in order to prevent the cylinder from sliding between the dies and to give it a revolving motion. The plates or dies may be so arranged as to thread or form a screw in their motion either from right to left or from left to right or in each part of their reciprocating motion. The wire or cylinder is introduced at or near the end of one of the dies, and is seized by the other as it passes and driven out at the other end, the screw being threaded or formed with entire accuracy and with a degree of perfection that will always correspond with the fineness of the metal and the workmanship of the machinery.

What I claim as my invention, and for the use of which I ask an exclusive privilege, is—

The improvement in the mode of manufacturing the wood-screw, which consists in the method of raising or producing the thread by forcing up the metal of the cylinder or wire of which the screw is made, so as to constitute the thread by rolling and compressing the cylinder between grooved plates or dies of the foregoing description, by whatever machinery the dies are worked and in whatever way the motion is given or pressure applied.

HAZARD KNOWLES.

Witnesses:
AMHERST D. SCOVILL,
DILLON WILLIAMS.